United States Patent [19]
Eddy

[11] 4,185,904
[45] Jan. 29, 1980

[54] LIQUID CRYSTAL THERMOGRAPH FRAME ASSEMBLY

[76] Inventor: Herbert C. Eddy, P.O. Box 13126, Tampa, Fla. 33681

[21] Appl. No.: 889,427

[22] Filed: Mar. 23, 1978

[51] Int. Cl.² ............................................ G03B 29/00
[52] U.S. Cl. ...................................... 354/80; 354/81
[58] Field of Search ................. 354/80, 81, 292, 293, 354/295, 126, 109; 355/39, 75

[56] References Cited
U.S. PATENT DOCUMENTS

| | | | |
|---|---|---|---|
| 2,235,355 | 3/1941 | Brown | 355/39 |
| 2,667,825 | 2/1954 | Nicholas | 354/295 |
| 2,758,503 | 8/1956 | Luffman et al. | 355/75 |
| 2,942,537 | 6/1960 | Zimmerman | 354/109 |
| 3,032,766 | 5/1962 | Weaver | 354/81 X |
| 3,168,859 | 2/1965 | Mast | 354/126 X |
| 4,091,402 | 5/1978 | Siegel | 354/293 |
| 4,114,167 | 9/1978 | McKee | 354/81 |

*Primary Examiner*—Donald A. Griffin
*Attorney, Agent, or Firm*—Duckworth, Hobby, Allen & Pettis

[57] ABSTRACT

A frame assembly for use in combination with a sheet of liquid crystals and a camera for the purpose of facilitating the permanent record of thermal variation of living body tissues. The frame assembly comprises a base including structure for operatively disposing a sheet of liquid crystals at one end and a camera at the other. A movable light source positioning arm is disposed on the base for the purpose of directing illumination onto the sheet of crystals of which a photograph is to be taken.

7 Claims, 3 Drawing Figures

LIQUID CRYSTAL THERMOGRAPH FRAME ASSEMBLY

BACKGROUND OF THE INVENTION

1. Field of the Invention

The present invention relates to a liquid crystal thermograph frame assembly for use primarily in obtaining a permanent record of thermal variation of living tissues in photographic form.

2. Description of the Prior Art

The use of heat-sensitive liquid crystals as a diagnostic tool is both well known and accepted in the medical profession. This technique has come to be identified by the term "thermography," and in this instance involves the placement of a sheet of liquid crystals in juxtaposition to the portion of a patient's body to be observed. A second type of thermography identified as infrared thermography is also currently utilized by the medical community in the United States and throughout the world; however, the present invention relates to liquid crystal thermographic techniques. By virtue of their chemical nature, the crystals will actually exhibit varied color patterns in response to the temperature of the tissues. Using these techniques of thermography physicians may identify specific areas and locations of increased thermal activity. Such areas are quite often evidence of infection, tumors, or the presence of cancerous cells. Numerous prior art patents disclose specific devices and methods for utilizing crystals in thermographic techniques.

For example, U.S. Pat. No. 4,043,324, discloses a method of chiropractic analysis using a sheet of liquid crystals. U.S. Pat. No. 3,847,139, discloses a device similar in construction to that of a brassiere including a layer of liquid crystal material for the detection of breast cancer by visual observation. A construction for such a layer, or sheet, of liquid crystals is disclosed in U.S. Pat. No. 3,993,809. Other analogous prior art methods and devices are disclosed in the following U.S. Pat. Nos.: 3,970,074; 3,830,224; 3,620,889; and 3,533,399.

Thus, the efficacy of liquid crystal thermography as a diagnostic tool is well known in the prior art. However, certain shortcomings with regard to the technique have also been identified.

For example, thermography is often utilized as a means for detecting the presence of cancerous cells, particularly in women of child-bearing age. The medical profession has recognized that the non-destructive character of thermographic diagnosis is in many instances preferred over X-ray techniques. The shortcoming of thermography, however, derives from the fact that unlike X-rays, current state-of-the-art techniques do not provide for a permanent liquid crystal thermographic record. While certain ones of the prior art patents referred to above discuss the desirability of permanently recording the "exposed" liquid crystal sheet, they neither disclose nor suggest an efficient device for providing a permanent photographic record.

It is, of course, to be understood that thermographic photographs would be extremely beneficial not only for purposes of diagnosis and prognosis, but also to enable the treating physician to visually observe and evaluate the results of clinical treatment. It is therefore the object of this invention to provide a new frame assembly for making liquid crystal thermographs which constitute a photographic record as permanent as any other photographs yet which can be quickly, easily and inexpensively obtained by the physician or his medical assistants. In keeping with this broad objective, such an assembly should be of relatively simple construction so as to facilitate its use without the need of providing detailed training and maintenance programs. Preferably, such an assembly would also be of relatively small size so as to provide portability, thereby allowing its use in a variety of locations. Perhaps of most importance is the fact that the assembly must be constructed so as to provide photographs of the thermally exposed liquid crystals of a consistent, high quality nature.

SUMMARY OF THE INVENTION

The present invention relates to a liquid crystal thermograph frame assembly for use primarily in obtaining a permanent record of thermal variations of living tissue. The assembly is intended to be used principally by physicians for diagnosing illnesses such as tumors and cancers and for subsequently monitoring and evaluating the treatment of such illnesses.

In a preferred embodiment of the liquid crystal thermograph frame assembly the use of an instant camera such as that manufactured and sold by the Polaroid Corporation and identified as the model SX-70 is contemplated. It is to be understood, however, that the scope of the present invention is not limited to any specific camera means utilized for the purpose of obtaining the permanent photographic record. Similarly, the assembly of this invention contemplates the use of liquid crystals in sheet form; however, the scope of the invention is not limited to any one specific liquid crystal material.

Accordingly, the frame assembly of the present invention comprises a base means formed from first and second planar segments. These planar segments are attached to each other in abutting relation along one of their edges and are angularly oriented one to the other. A crystal receiving means is disposed on the free end of the first planar segment and comprises a pair of fastening means in the nature of thumb screws. Of course, other suitable fastening means might be utilized. The opposite end of the base means defined by the free end of the second planar segment comprises camera mounting means, whereby the particular camera being utilized may be attached. At this point it should be noted that the angular relationship between the first and second planar segments of the base means is such that a camera attached to the camera mounting means will be properly oriented to photograph the exposed liquid crystal thermograph.

The frame assembly further comprises a liquid crystal holder means which is removably attachable to the base means by the crystal receiving means disposed at the free end of the first planar segment. This liquid crystal holder means comprises a frame including first and second frame elements. In the preferred embodiment these first and second frame elements are hingedly attached to each other so as to facilitate the insertion and retention of a sheet of liquid crystals therebetween. Furthermore, each of the first and second frame elements includes corresponding first and second apertures formed therein whereby an operative area of the sheet of liquid crystals will be exposed. In use, then, a sheet of liquid crystals is placed within the crystal holder means and that holder means is attached to the assembly base means by the crystal receiving means comprising the pair of thumb screws. The sheet of liquid crystals is thereby disposed for operative engagement with the body tissues to be observed while at the same time lying along the focal plane of the lense of a camera attached to the camera mounting means.

Inasmuch as the photographic record of the liquid crystal thermograph will normally be obtained under conditions of artificial, interior lighting, the frame assembly further comprises a light source positioning means movably disposed on the body means such that at least a portion of the light source positioning means is disposable between the crystal receiving means and the camera mounting means. In the preferred embodiment the light source positioning means comprises an arm means, one end of which is movably attached to the body means and the other end of which comprises a light source platform means. The light source platform means is movably attached to the other end of the arm and is dimensioned and configured for the retention of a flash assembly which is compatible with the camera being utilized. At this point it should be noted that the surface of liquid crystal sheets is relatively smooth and reflective. Accordingly, it has been determined that the placement and disposition of the light positioning means with regard to the surface of the liquid crystal sheet being photographed is critical. It is for this reason that the light positioning means of the present invention is movable, so that the angle of incidence of the illuminating light may be adjusted so as to minimize, if not eliminate, its reflection into the camera lense.

Operation and use of the liquid crystal thermograph frame assembly of this invention is relatively simple. First, the camera for which the assembly is designed is attached to the camera mounting means. The corresponding flash, or other auxiliary light source, is then positioned on the light source platform and operatively connected to the camera. A sheet of liquid crystals is placed within the liquid crystal holder means, and that holder means is operatively attached to the assembly base by the crystal receiving means. The physician or other operator then places the sheet of liquid crystals into intimate contact with the body tissue to be observed and holds the crystals there while they are "exposed" so as to properly display the body's thermal variations. This period of time is, of course, to be determined in accord with the characteristics of the particular liquid crystal material being utilized. Once appropriate exposure of the liquid crystals is observed, the operator merely activates the camera to obtain a permanent record of his visual observation.

While the above summary has been given with specific regard to a preferred embodiment of the frame assembly utilized in medical diagnostic techniques, it is to be remembered that this invention may be utilized in virtually any environment wherein it is desired to make permanent, photographic records of thermal variations detected by liquid crystal thermograph techniques. Similarly, it is to be understood that minor, engineering-type modifications of the assembly might be made in order to accommodate different models of cameras and different types and sizes of liquid crystal sheets. For example, the angular relationship between the two planar segments of the base means will vary according to the particular camera being utilized. It is contemplated that the angular orientation might actually comprise a straight line, or 180° angle. It is also contemplated that the liquid crystal holder means may comprise a unitary construction which is grooved or slotted to receive the sheet of liquid crystals. Depending upon the area of the body to be observed, it might also be desirable to form the liquid crystal holder means from a relatively flexible material so as to allow the sheet of liquid crystals to more efficiently conform to the body's contours. While in the preferred embodiment described hereinafter the light positioning means is disposed between the camera and the liquid crystal holder means, particular end use applications might dictate placement of the external light source at a different position. In this regard, while it is a primary consideration to so place the external light source as to minimize reflection into the lense of the camera, it should be also noted that the external light source provides the useful function of insuring not only true but also constant color rendition of the "exposed" liquid crystals.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
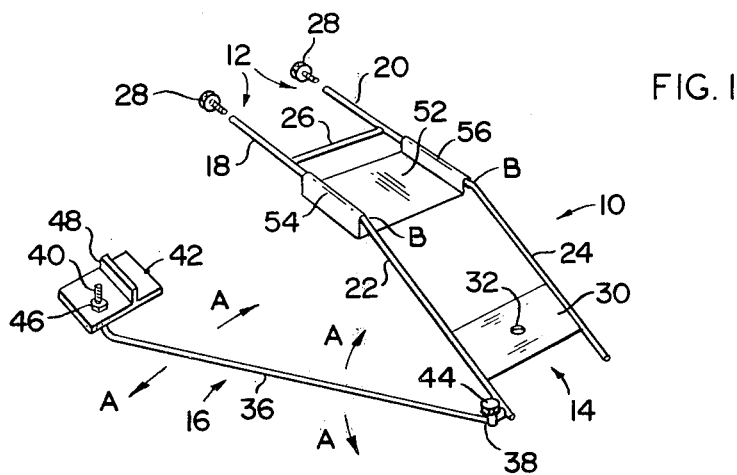
FIG. 1 is a perspective view of a preferred embodiment of the frame assembly.

As most clearly seen in the view of FIG. 1, the preferred embodiment for the liquid crystal thermograph frame assembly of the present invention comprises a base means generally indicated as 10 including crystal receiving means generally indicated as 12 and operatively disposed on one end of base means 10 and further including camera mounting means generally indicated as 14 formed on the other end of base means 10. A light source positioning means generally indicated as 16 is movably disposed on base means 10 for generally pivotal movement as indicated by directional arrows A. Still with regard to the view of FIG. 1, it can be seen that base means 10 includes a first planar segment defined by rods 18 and 20 and a second planar segment defined by rods 22 and 24. For purposes of stability and reinforcement, a cross member 26 is disposed in substantially transverse, interconnecting relation between rods 18 and 20 defining the first planar segment. It can also be seen that rods 18 and 22 as well as rods 20 and 24 meet at the intersection of the first planar segment with the second planar segment as indicated at points B. As will be set forth in greater detail below, the first planar segment and the second planar segment of base means 10 are angularly oriented with respect to each other, the points of intersection defining line B—B. The nature and purpose of this angular orientation will be discussed in greater detail hereinafter.

As clearly seen in the view of FIG. 1, crystal receiving means 12 comprises a plurality of fastening means such as, for example, thumb screws 28 the threaded portions of which matingly engage correspondingly threaded apertures (not shown) formed in the free ends of rods 18 and 20, respectively.

The camera mounting means 14 of the preferred embodiment comprises a plate 30 disposed in transverse interconnecting relation between second planar segment rods 22 and 24. Accordingly, plate 30 defines at least a portion of the second planar segment of base means 10. A mounting aperture 32 is formed through plate 30 so that a camera such as that indicated by reference numeral 34 in the view of FIGS. 2 and 3 may be mounted thereon. This mounting is accomplished by passing a fastening means through mounting aperture 32 in engagement with a corresponding receptor, such as a tripod bracket, formed on the body of camera 34.

Finally, the view of FIG. 1 illustrates the construction of light source positioning means 16 as comprising arm means 36, one end 38 of which is movably attached to base means 10, and the other end 40 of which comprises a light source platform means including a light shelf 42 attached thereto. End 38 of arm means 36 is attached to base means 10 by connector 44, and connector 44 may be selectively engaged and disengaged so as to permit movement of arm 36 as indicated by arrows A. In a similar fashion, light shelf 42 is movably attached to end 40 of arm means 36 as by, for example, nut 46. Accordingly, both the positions of arm 36 and the orientation of light shelf 42 may be adjusted. It should also be noted that light shelf 42 includes a shoulder 48 formed in substantially perpendicular relation to the top surface thereof so as to facilitate the retention of a flash assembly 50 thereon as more clearly seen in the views of FIGS. 2 and 3.

Though not essential to the frame assembly of the present invention, an auxiliary shelf 52 may be provided across the first planar segment between rods 18 and 20. As shown in the view of FIG. 1, auxiliary shelf 52 may be attached as by deforming side portions 54 and 56 around rods 18 and 20, respectively. With the type camera 34 shown in the views of FIGS. 2 and 3, auxiliary shelf 52 provides a receptacle for the photograph as it is expelled from camera 34, and may also provide a support surface for a battery pack (not shown) used to energize flash assembly 50.

Figure 2:
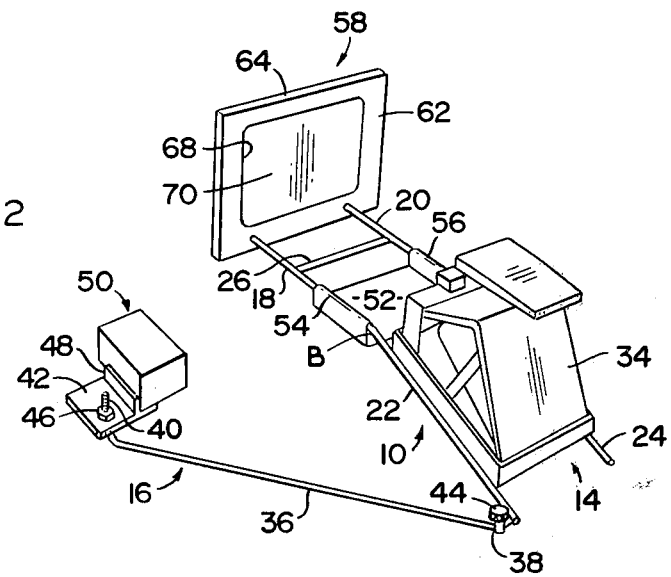
FIG. 2 is a perspective view similar to that of FIG. 1 showing the frame assembly in combination with a sheet of liquid crystals and a camera.
Figure 3:
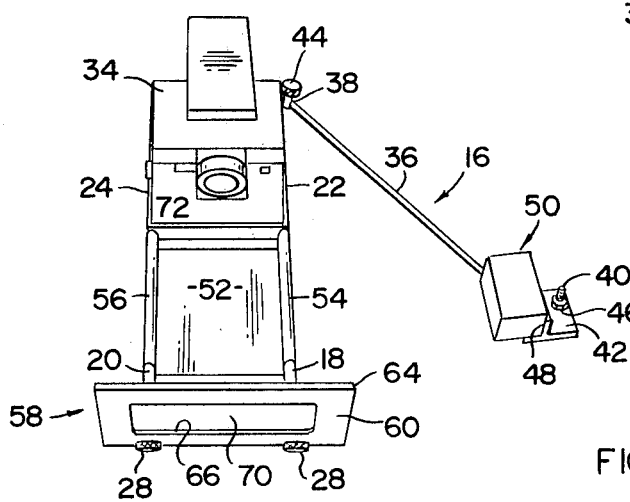
FIG. 3 is a top perspective view of the combination shown in FIG. 2.

Turning now to the views of FIGS. 2 and 3, attention is invited to the liquid crystal holder means generally indicated as 58. As best seen in the view of FIG. 3, liquid crystal holder means 58 is removably attachable to base means 10 by thumb screws 28. Liquid crystal holder means 58 comprises a frame including first frame element 60 and second frame element 62. In the preferred embodiment first frame element 60 and second frame element 62 are hingedly connected one to the other along top edge 64 of liquid crystal holder means 58. Each of the frame elements 60 and 62 include corresponding first and second apertures 66 and 68, respectively, formed therein. Accordingly, a sheet of liquid crystal material 70 may be placed between first frame element 60 and second frame element 62 so as to be exposed through the opening defined by first aperture 66 and corresponding second aperture 68. In the assembled position shown in the views of FIGS. 2 and 3, the liquid crystal material 70 is operatively retained within liquid crystal holder means 58 for placement against the body tissue to be observed. Once sheet 70 has sufficiently reacted to the body's temperature, camera 34 is actuated by the operator thereby providing a permanent photographic record of the thermograph.

It is to be noted that base means 10, and more particularly its first and second planar segments defined by rods 18 and 20 and 22 and 24, respectively, are specifically dimensioned and configured so as to present the sheet of liquid crystal material 70 at the focal plane of lense 72 of camera 34. Accordingly, it is not necessary for the operator to either focus or aim camera 34. Accordingly, it is to be understood that this precise size and configuration of the frame assembly and particularly base means 10 would be varied in accord with the characteristics of the camera being utilized.

As previously stated, it is well known that the surface of liquid crystal sheet 70 is relatively glossy and light-reflective. Therefore, care must be taken concerning the placement of flash assembly 50 with regard to sheet 70 so as to minimize, if not eliminate, the reflection of light into lense 72. Experimentation has revealed that a placement of flash assembly 50 so that its light will be emitted along a plane substantially parallel to that of sheet 70 gives quite acceptable results. It is for this reason that light source positioning means 16 has been constructed in accord with the description given above. It is to be understood that the exact placement and orientation of light source positioning means 16 may vary depending upon the nature of the auxiliary light source, or flash unit, being utilized.

In conclusion, actual testing of working models of the subject assembly have revealed that it may be desirable to incorporate a handle element into the structure of the base means 10. It is further contemplated that such a handle might take the form of a pistol grip formed on the after end of rod 24 in substantially transverse relationship thereto. In actuality, this grip might extend either above or below the plane defined by the second planar segment. It is further contemplated that in the event such a handle structure is utilized, remote actuation means for camera 34 would be provided on the handle.

It will thus be seen that the objects set forth above, among those made apparent from the preceding description, are efficiently attained, and since certain changes may be made in the above construction without departing from the scope of the invention; it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described, what is claimed is:

1. A liquid crystal thermograph frame assembly for use in combination with a sheet of liquid crystals and a camera for obtaining a permanent record of thermal variation of living tissue, said frame assembly comprising: base means comprising first and second planar segments disposed in abutting, non-linear intersecting relation to each other; crystal receiving means operatively disposed on the free end of said first planar segment; liquid crystal holder means removably attachable to said base means by said crystal receiving means, said liquid crystal holder means comprising first and second frame elements hingedly attached to each other and corresponding first and second apertures formed therein whereby a sheet of liquid crystals may be operatively retained between said first and second frame elements and operatively mounted on said free end of said first planar segment; camera mounting means formed on said second planar segment in substantially opposed relation to said crystal receiving means whereby a camera may be mounted thereon; and light source positioning means movably disposed on said second planar segment, at least a portion of said light source positioning means being disposable between said crystal receiving means and said camera mounting means whereby the sheet of liquid crystals may be illuminated.

2. A liquid crystal thermograph frame assembly as in claim 1 wherein said light source positioning means comprises arm means, one end of said arm means being movably attached to said second planar segment and the other end of said arm means comprising a light source platform means.

3. A liquid crystal thermograph frame assembly as in claim 2 wherein said one end of said arm means is pivotally attached to said second planar segment.

4. A liquid crystal thermograph frame assembly as in claim 2 wherein said light source platform means comprises a light shelf movably attached to said other end of said arm means.

5. A liquid crystal thermograph frame assembly as in claim 1 wherein the effective longitudinal dimension defined by said first and second planar segments is such that a sheet of liquid crystals disposed on said crystal receiving means will lie along the focal plane of the lense of a camera attached to said camera mounting means.

6. A liquid crystal thermograph frame assembly as in claim 1 wherein said crystal receiving means comprises a plurality of fastening means removably attachable to said three end of said first planar segment.

7. A liquid crystal thermograph frame assembly as in claim 1 further comprising an auxiliary shelf disposed transversely across said first planar segment in receiving relation to a photograph ejected from an automatic camera disposed on said camera mounting means.

* * * * *